United States Patent
De Bretagne et al.

[15] 3,707,676
[45] Dec. 26, 1972

[54] SETPOINT AND ACTUAL VALUE INDICATOR

[72] Inventors: Yves De Bretagne; Francis Manier, both of Amiens, France

[73] Assignee: Honeywell Inc., Minneapolis, Minn.

[22] Filed: May 5, 1971

[21] Appl. No.: 140,440

[30] Foreign Application Priority Data

July 6, 1970 France..................................7025004

[52] U.S. Cl..................................324/157, 116/129
[51] Int. Cl. ..............................................G01r 1/08
[58] Field of Search ..............324/157, 115; 116/129

[56] References Cited

UNITED STATES PATENTS 1,593,626 7/1926 Foote....................................324/157

FOREIGN PATENTS OR APPLICATIONS 1,515,995 1/1968 France..............................116/129 R

*Primary Examiner*—Alfred E. Smith
*Attorney*—Lamont B. Koontz and Trevor B. Joike

[57] ABSTRACT

Condition controlling apparatus for adjusting the setpoint of and indicating the actual value for a condition, is provided with a movable scale on the front face of a movable disc, a setpoint mark and a stationary scale, identical to the movable scale but in which the direction of increasing values is reversed, disposed on the front face of a stationary front plate having a window therein for viewing the pointer of a galvanometer and revealing only a limited angular zone on the movable scale.

8 Claims, 1 Drawing Figure

PATENTED DEC 26 1972　　3,707,676
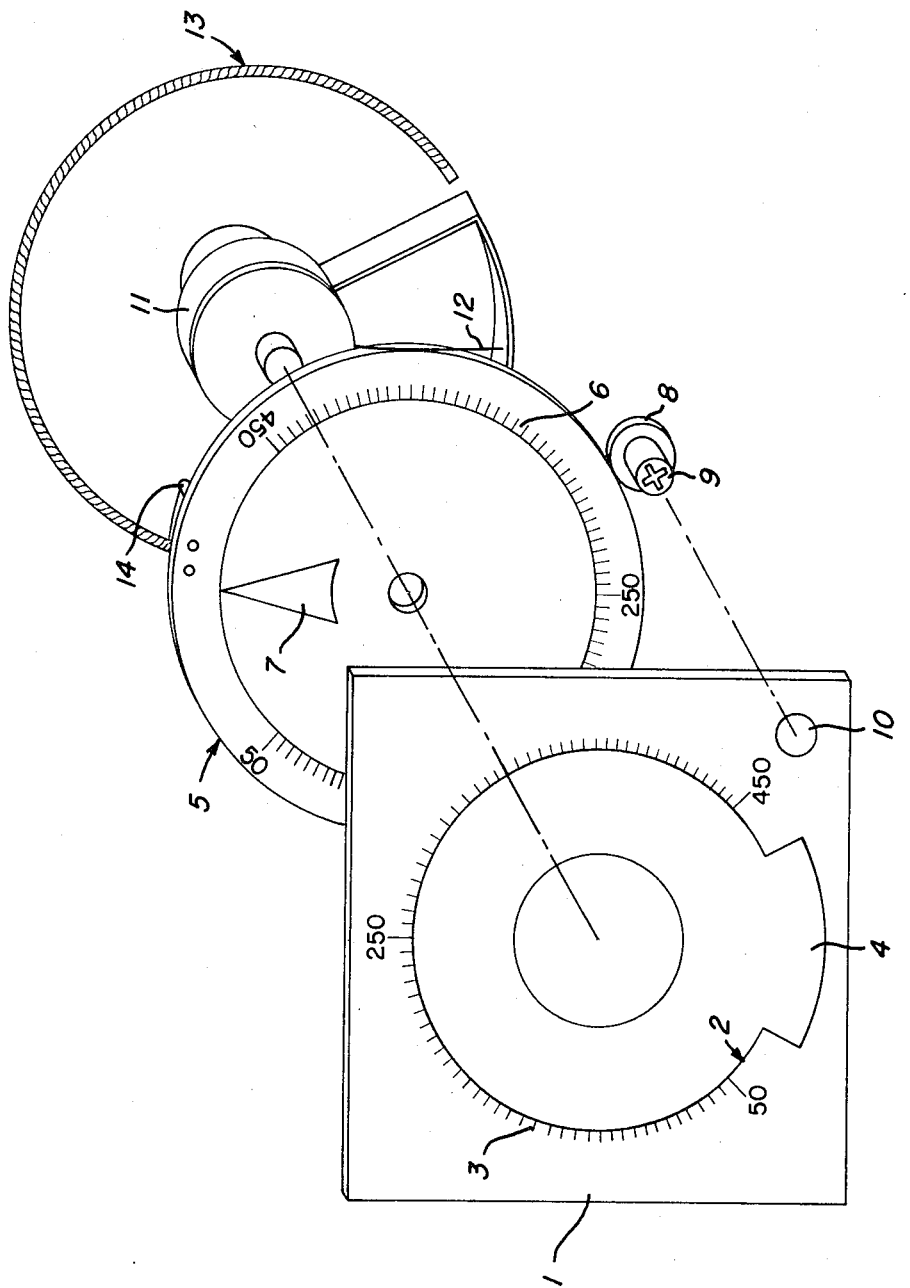
INVENTORS
YVES de BRETAGNE
FRANCIS MANIER
BY [signature]
ATTORNEY.

SETPOINT AND ACTUAL VALUE INDICATOR

The present invention concerns improvements in the device described in French Pat. No. 1,510,984 and more particularly indicating means for said device.

The object of the invention is to provide a device which is both more compact and easier to read and adjust.

An object of the present invention is to provide an apparatus of the type described in the above mentioned French Patent, i.e. comprising, in particular, a setpoint display scale rotatable about an axis and a galvanometer whose axis coincides with the axis of rotation of said scale and which comprises a pointer arranged to be displaced in front of a dial carrying a stationary scale parallel to the movable scale, the latter being fixed to the movable element of a potentiometer arranged to assure the adjustment of the setpoint. The improvement of this apparatus comprising the movable scale positioning on the front face of a disc rotatable about an axis coaxial with the axis of rotation of the pointer of the galvanometer. The scale is disposed on the periphery of the disc and the disc further comprises a setpoint mark. The stationary scale which is identical with the movable scale but the direction of increasing values is reversed, is disposed on the front of a stationary plate at the periphery thereof. The stationary plate is provided with a circular opening coaxial with the movable disc, and is further provided with a window enabling the viewing of the pointer of the galvanometer and revealing only a limited angular range of the movable scale, the window being provided in the front plate in the dead angle zone delimited by the stationary scale.

The setpoint mark of the movable scale is preferably located opposite the middle value of the movable scale relative to the axis of the disc and the window in the front plate is preferably located opposite the middle value of the stationary scale relative to the axis of the apparatus.

According to a particularly interesting embodiment the movable scale is transparent and disposed between the front plate and the pointer of the galvanometer.

Further, means are advantageously provided for adjusting the angular position of the movable disc from the exterior of the case of the apparatus.

Other features and advantages will be brought out in the following description of an embodiment of the device according to the invention, this description being made solely by way of a non-limiting example and with respect to the accompanying drawing in which the single figure shows an exploded view of the indicator unit of a setpoint indicating and adjusting apparatus.

This single FIGURE only shows the display means for the control apparatus, the control apparatus can be identical to that described in the above-mentioned French Patent.

These means comprise a stationary front plate 1 in which is provided a circular opening 2 at the periphery of which is a scale 3, in the illustrated embodiment, going from a value of 50 to 450, the direction of the increasing values on the scale 3 being clockwise.

In the dead angle zone of the scale 3, i.e. at the nongraduated portion of the opening 2, is provided a window 4 in the shape of an arc which is located substantially opposite the value 250 on the scale 3.

Behind the front plate 1 is mounted a disc 5, coaxial to the circular opening 2, which is rotatable about its axis. The disc 5 is of transparent material and comprises on its front face and at its periphery a scale 6 identical to the scale 3 except for the direction of increasing values which is the reverse, i.e. to go from the value 50 to the value 450 it must be rotated counter-clockwise.

Further, the disc 5 carries a setpoint mark 7 disposed opposite the value 250 on the scale 6 relative to the axis of the disc 5.

Finally, the disc 5 is angularly adjustable by means of the friction roller 8 in contact with the edge of the disc 5 and fixed to an adjusting screw 9 accessible through a hole 10 in the front plate 1 of the apparatus.

Behind the disc 5 is coaxially mounted the galvanometer 11 whose pointer 12 rotates about the axis of the galvanometer and the scales 3 and 6.

Finally, concentrically with the galvanometer 11 is disposed the setpoint potentiometer 13 of the apparatus cooperating with a slider or wider arm 14 fixed to the disc 5.

Once mounted, the elements shown in the figure are disposed in such a manner that the disc 5 is sandwiched between the plate 1 and the galvanometer and the end of the pointer 12 is visible in the window as well as the setpoint mark 7 through the circular opening 2 when the whole scale 6 is covered by the plate 1 except for an angular zone revealed by the window and delimited by the length of the arc of the window.

The adjustment of the setpoint mark 7 is effected very easily by turning the screw 9 in such a way as to move the disc 5. Rotation of the disc 5 also results in the rotation of the scale 6 such that the portion of scale 6 corresponding to the setpoint value as selected by mark 7 is positioned within window 4. Thus the portion of scale 6 within window 4 is automatically related to a range of the scale 3 as determined by the positioning of the setpoint mark 7.

The adjustment of the setpoint is effected very easily by turning the screw 9 in such a way that the setpoint mark 7 is brought in front of value or mark on the scale 3 corresponding to the setpoint mark. A fraction of the scale 6, delimited by the length of the window 4, is thus automatically brought back in front of the pointer 12 of the galvanometer. In accordance with the invention described in French Pat. No. 1,510,984, the pointer 12 therefore indicates on the scale 6 the true or actual value of the regulated value which can thus easily be compared to the value of the setpoint displayed by the setpoint mark on the scale 3.

Such an arrangement provides a further advantage over the embodiment described and shown in the patent in that the stationary scale runs along the whole range of the adjustments of the setpoint and is not limited to the range of the galvanometer pointer which thus makes the reading and use of the apparatus easier.

The present invention, of course, is not limited to the illustrated and described embodiment and, on the contrary, covers all possible variation. Thus, the disc 5 can be disposed behind the galvanometer 11 in which case the disc is not necessarily transparent since the pointer 12 of the galvanometer is not covered by the disc 5, the disc preferably has a reflecting front face.

Further, the interior face of the front face 1 can be provided with a light source for lighting the portion of the scale 6 visible through the window 4.

The embodiments of the invention in which an exclusive property or right is claimed are defined as follows:

1. A setpoint and actual value indicator for establishing a setpoint around which a condition is to be controlled and for indicating the actual value of the condition, said indicator comprising:
   a front plate having a circular opening therein and further having a stationary scale, disposed at the periphery of said opening for indicating the setpoint of said condition;
   a rotatable disc mounted coaxially with and behind said front plate and having a septoint mark thereon cooperating with said front plate opening for indicating a selected value of said stationary scale and further having an actual value scale disposed thereon;
   a galvanometer mounted coaxially with said front plate and said disc and having a pointer for cooperating with said actual value scale for indicating said actual value of said condition; and
   said front plate having a window therein for revealing through said front window only a limited range of said actual value scale, said range including the setpoint value around which the condition is to be controlled.

2. The indicator according to claim 1 further comprising a potentiometer for establishing a setpoint for said condition and a wiper arm mounted on said rotatable disc and cooperating with said potentiometer for selecting said set point.

3. The indicator according to claim 2 further comprising means for rotating said rotatable disc from the exterior of said indicator.

4. The indicator according to claim 2 wherein said setpoint is located opposite the middle value of said actual value scale.

5. The indicator according to claim 4 wherein said window is located opposite the middle value of said stationary scale.

6. The indicator of claim 5 wherein said rotatable disc is transparent and mounted between said front plate and said galvanometer pointer.

7. The indicator according to claim 1 wherein the rotatable disc is transparent and mounted between said front plate and said galvanometer pointer.

8. The indicator according to claim 1 wherein said rotatable disc is mounted between said galvanometer pointer and said front plate.

* * * * *